(12) United States Patent
Ferradini et al.

(10) Patent No.: US 11,321,416 B2
(45) Date of Patent: May 3, 2022

(54) COMPUTER-IMPLEMENTED METHOD FOR THE GENERATION OF ZOOMABLE HIERARCHICAL TEXTS STARTING FROM AN ORIGINAL ELECTRONIC TEXT

(71) Applicant: KJUICER.COM S.R.L., Milan (IT)

(72) Inventors: Giampaolo Maurizio Ferradini, Milan (IT); Francesco Frassinelli, Milan (IT)

(73) Assignee: KJUICER.COM S.R.L., Milan (IT)

( * ) Notice: Subject to any disclaimer, the term of this patent is extended or adjusted under 35 U.S.C. 154(b) by 0 days.

(21) Appl. No.: 15/769,214

(22) PCT Filed: Oct. 19, 2016

(86) PCT No.: PCT/IT2016/000245
§ 371 (c)(1),
(2) Date: Apr. 18, 2018

(87) PCT Pub. No.: WO2017/068606
PCT Pub. Date: Apr. 27, 2017

(65) Prior Publication Data
US 2018/0307776 A1    Oct. 25, 2018

(30) Foreign Application Priority Data

Oct. 19, 2015  (IT) .................... 102015000062946

(51) Int. Cl.
*G06F 16/957*    (2019.01)
*G06F 40/169*    (2020.01)
(Continued)

(52) U.S. Cl.
CPC ........ *G06F 16/9577* (2019.01); *G06F 3/0482* (2013.01); *G06F 3/0483* (2013.01);
(Continued)

(58) Field of Classification Search
None
See application file for complete search history.

(56) References Cited

U.S. PATENT DOCUMENTS 7,747,943 B2 * 6/2010 Bargeron ............. G06F 40/169
715/235
8,635,520 B2 * 1/2014 Christiansen ......... G06F 17/241
715/230

(Continued)

OTHER PUBLICATIONS

PCT/IT2016/000245 International Search Report dated Mar. 13, 2017.

*Primary Examiner* — Christopher J Fibbi
(74) *Attorney, Agent, or Firm* — Arent Fox LLP; Michael Fainberg

(57) ABSTRACT

The present invention produces a system that improves the efficiency of reading and learning processes allowing an innovative use of the practice of highlighting and enhancing its effectiveness; that creates multiple hierarchical textual representations, and therefore with different levels of synthesis, significantly more efficient than the traditional ones; that combines, to the display of the text representations, a method for "browsing" texts that significantly alters subsequent reading patterns—or for subsequent readers—making them much faster and more effective for the acquisition or retrieval of information; that allows users to benefit from the contents of a text not only in a linear manner but also in a random access one.

11 Claims, 14 Drawing Sheets

(51) Int. Cl.
*G06F 3/0483* (2013.01)
*G06F 40/117* (2020.01)
*G06F 40/143* (2020.01)
*G06F 3/04812* (2022.01)
*G06F 3/04817* (2022.01)
*G06F 3/0482* (2013.01)

(52) U.S. Cl.
CPC ...... *G06F 3/04812* (2013.01); *G06F 3/04817* (2013.01); *G06F 40/117* (2020.01); *G06F 40/143* (2020.01); *G06F 40/169* (2020.01)

(56) References Cited

U.S. PATENT DOCUMENTS

| | | | | |
|---|---|---|---|---|
| 2007/0234209 | A1* | 10/2007 | Williams | G06F 3/04842 |
| | | | | 715/700 |
| 2008/0005664 | A1 | 1/2008 | Chandra | |
| 2008/0016164 | A1 | 1/2008 | Chandra | |
| 2012/0078612 | A1* | 3/2012 | Kandekar | G06F 17/2745 |
| | | | | 704/9 |
| 2012/0131520 | A1* | 5/2012 | Tang | G06F 3/04842 |
| | | | | 715/863 |
| 2013/0339885 | A1* | 12/2013 | Eom | G06F 3/048 |
| | | | | 715/764 |
| 2014/0089777 | A1* | 3/2014 | Roiniotis | G06F 3/048 |
| | | | | 715/234 |
| 2014/0157103 | A1 | 6/2014 | Lee | |
| 2015/0058716 | A1* | 2/2015 | Boothman | G06F 40/117 |
| | | | | 715/254 |
| 2015/0186350 | A1* | 7/2015 | Hicks | G06F 17/241 |
| | | | | 715/230 |

* cited by examiner

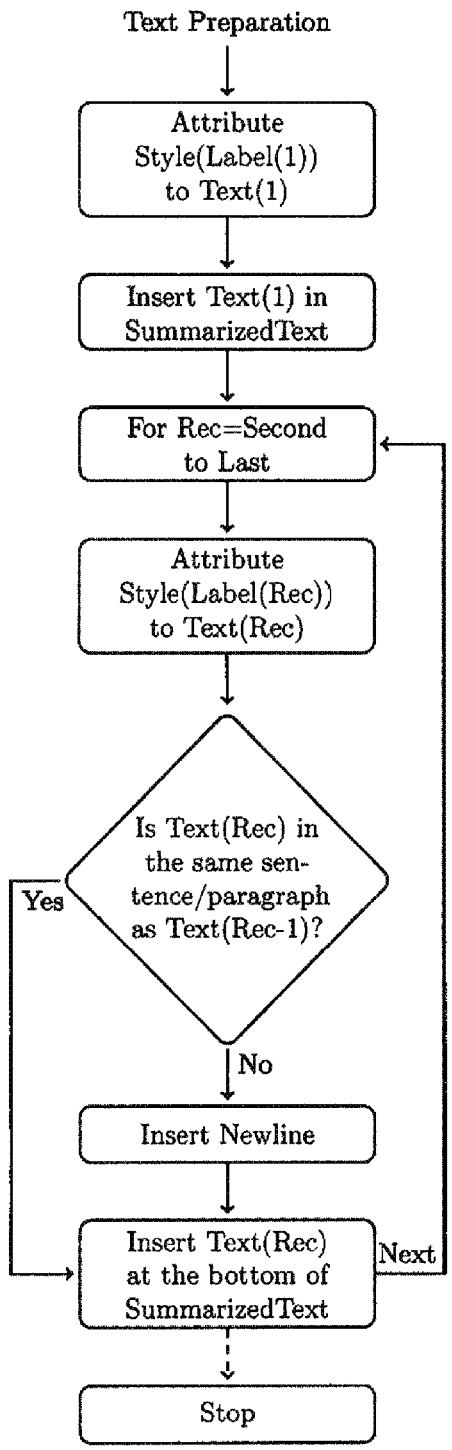

Legend
Text(N) : Text corresponding to
: the N-th highlight
Style(L) : Highligth Style L (see below)
Label(L) : Highligth Level L (see below)
Rec : Highlights Pointer for
: the 2nd to the last
Label(Rec): Highlight Level of
: the N-th highlight
Rec-1 : Pointer to the (N-1)th
: highlight

Variables - e.g.: three highlight levels
Style: possible values: 1, 2 and 3 correspond to
: fonts: Large, Medium, Small on black bkgd
Level: possible values: 1, 2 and 3

Fig. 5

(a)
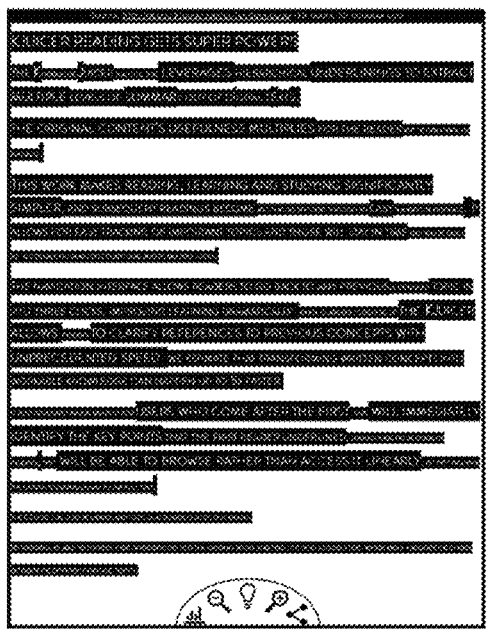
(b)
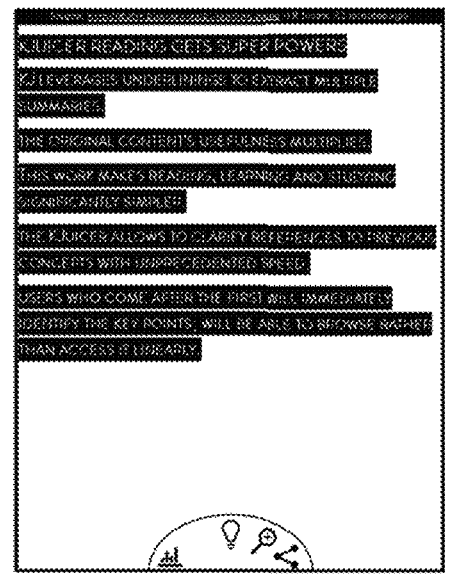
(c)
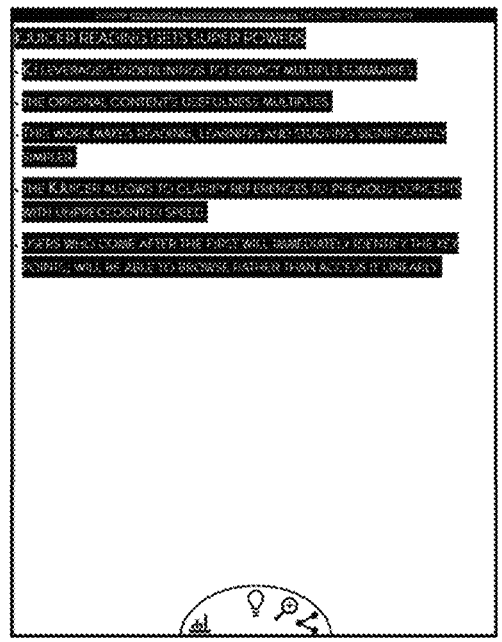
Fig. 12

Legend
For : For-Next Cycle to analyze the DB
Rec : Pointer for the Highlight's DB
Hilght(Rec): Highlight Record
: composed of (InPos, FinPos, Level)
Rec-1 : Record before current one,
: with Highlight Level 1
Text(Rec) : Text corresponding to
: Highlight(Rec) in the DB

COMPUTER-IMPLEMENTED METHOD FOR THE GENERATION OF ZOOMABLE HIERARCHICAL TEXTS STARTING FROM AN ORIGINAL ELECTRONIC TEXT

CROSS-REFERENCE TO RELATED APPLICATIONS

This application is the U.S. National Stage Application of International Patent Application No. PCT/IT2016/000245, filed on Oct. 19, 2016, which claims priority to Italian Patent Application No. 102015000062946, filed on Oct. 19, 2015, the contents of each of which is incorporated herein by reference in its entirety

TECHNICAL FIELD

The present invention relates to a method and system for the generation of hierarchical, zoomable texts starting from an original electronic text.

BACKGROUND

Highlighting a text to mark its relevant parts and concepts is a known technique. With such technique:
 the text remains extended, and consequently highlights remain scattered throughout the text;
  Re-reading time can be reduced, yet it remains rather long;
   There is a physiological need to re-read the context around the same emphasis to re-orient the eye;
  a "detachment", a large distance between highlights and original text is often generated; or
 Highlights are too extended and thus lack synthesis.

Starting from a set of highlights, a summary can be extracted. However, if the underlines are abundant, gains in the re-reading process, or for a subsequent reader, are relatively reduced since the extracted text is still rather long.

Conversely, if the reader keeps the number and extent of highlights small, so as to highlight only the really important concepts, too wide a gap gets created between the original text, full of information, and the new text extracted thanks to such highlights, making the re-reading less useful also in this case, although for a different reason.

There is therefore a need for a method for curation/selection/extraction of structured information from a text, for possible re-use or sharing, which solves the problems of the prior art, and in particular to reach at least partially the following effects:
1. structure information contained in a text to make it easily accessible later;
2. fix concepts found in a text, in a way such that the reader does not have to repeat the same study process in successive re-readings, perhaps after a long time;
3. making the transfer of knowledge gained by the reader easier, to one or multiple other readers;
4. avoid readers, or at least certain categories of readers, to fully repeat the study effort carried out by the first one of them;
5. Provide an easy way to "process" written content so that it then becomes browsable, in a way similar to a content organized inside a well-structured websites, without having to build such a website, and potentially even obtaining a more flexible browsing experience for texts than the one currently allowed by html.
6. eliminate the need for processing written content linearly;
7. significantly increase reading speed for texts whose content is already familiar to the reader, or increasing learning speed where such content is not known;
8. integrate/add text with additional material while maintaining its integrity and avoiding the creation of a derivative work or a plagiarism;
9. create a work that is the "remix" of different works, yet keeping their integrity and original content fully intact and available;
10. turn text content into slides and bullet points without the need to resort to multiple copy-paste and formatting; and
11. producing a tool that provides suitable data for feeding "human-assisted computation" and machine learning activities. In fact today semantic search engines encounter rather big difficulties in extracting the meaning contained in a complex and extended text. And in finding examples to train semantic engines.

SUMMARY

The purpose of the present invention is a method and a system that solves at least in part the problems of the prior art and reaches at least in part the effects mentioned above.

Object of the present invention is a method and a system according to the annexed claims, which form an integral part of the present description.

More precisely, the present invention produces a system that creates multiple hierarchical textual representations, and therefore with different levels of synthesis, significantly more efficient than the traditional ones; combines visualization of such representations with a "browsing" of text that significantly alters subsequent readings after the first—be it by the author of the work or subsequent readers—making the resource/s much faster and more effective for acquiring or retrieving information; allows users to enjoy the contents of a text not just in a linear fashion but also with random access. Such zoomability implies keeping track of the position of interest notwithstanding addition or removal of text that derive from switching to a different layer, thus preventing selected content from shifting out of the viewable area within the window. In practice, the invention solves a conflict between viewing requests made at the same time to the computer (jumping to a different hierarchical level while maintaining the on-screen position at the reading point during retrieval of a different set of information, reading point that corresponds to a line of sight independent of the cognitive content of the text, thus satisfying a physiological rather than cognitive need).

BRIEF DESCRIPTION OF THE DRAWINGS

The invention will be now described, for illustrative but not limiting it purposes, with particular reference to the enclosed figures, in which:

FIG. 5 shows a diagram flowchart of a different embodiment of the method according to the invention;

FIG. 12 shows in (a) a text extracted with the method according to the invention, in (b) a first formatting example of such extract text, and in (c) a second formatting example of the extracted text.

DETAILED DESCRIPTION OF EXAMPLES OF THE INVENTION

Figure 1:
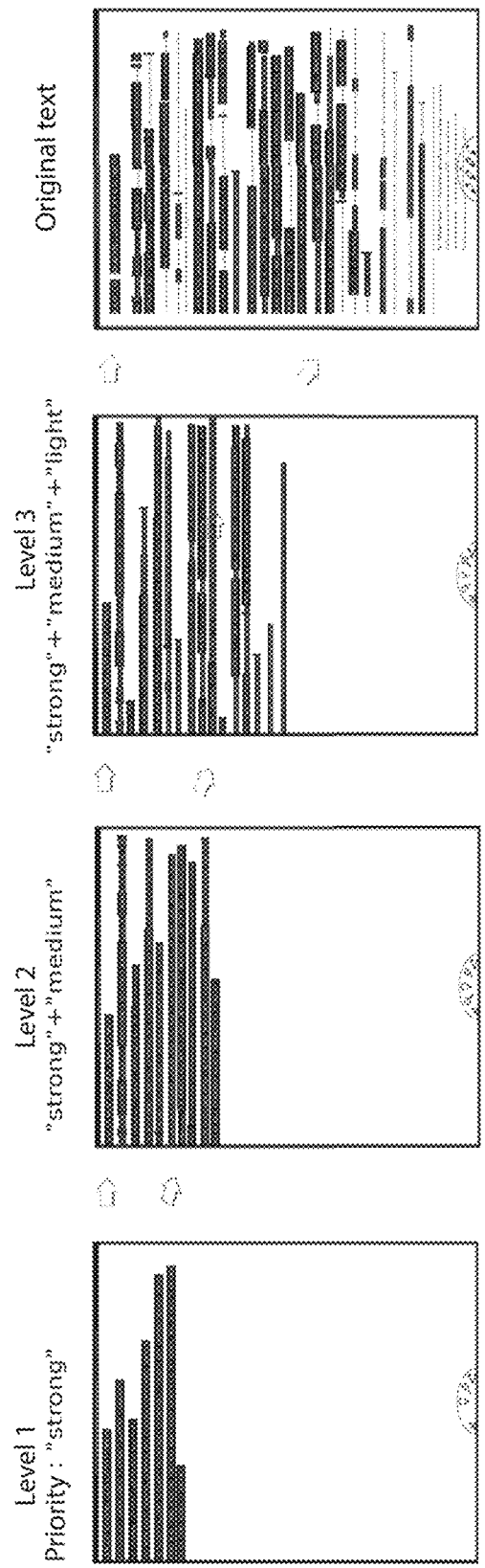
FIG. 1 shows a representation in consecutive expansions of the structure of levels obtained with the method according to the invention.

The aim of the invention is achieved working on three fronts: the highlights, the representation of the text and the browsability.

Highlights

Highlights are multiple, i.e. they are displayed with different colors which point to a respective "level of highlight". The minimum to achieve results that differ from existing solutions is two levels of priority. In this description we will refer to a model with three levels of priority, but this is not to be construed as limitative of the inventive concept, being it equally possible to create a structure with one, two, or more than three levels of highlights.

The Highlight Level associated with each highlight is hierarchical (level of relevance of the text). By hierarchical it is meant that a highlight cannot be used disregarding its Highlight Level (which is normally a specific color, for the user of this example, or a different font size on a black background, as represented in the enclosed pictures). The user must then use such highlight in a manner consistent with the other levels: if as in the example there are three Priority Levels, the reader—in order to get the result that the invention allows—must use Level 1 (the "higher" in the hierarchy, associated with the largest font in FIGS. 1 to 3, and 7 to 10) to highlight the fundamental concepts. Instead, he may use Level 2 (associated with the medium sized font in FIGS. 1 to 3, and 7 to 10) to highlight important but less relevant concepts, which enrich and integrate the concepts outlined with Level 1. In turn he may use Level 3 (associated with the smallest font with black background shown in FIGS. 1 to 3, and 7 to 10) to complete the picture with the details he deems less relevant yet worth keeping track of (or reporting to third parties), meaningful but not essential as those highlighted with Level 1 or important as those he chose to highlight with Level 2.

If we were to compare the method according to the invention to a bicycle for reading, the highlights would constitute the gearshift mechanism of such bicycle.

Highlights are stored in a database, on a tangible physical memory.

Highlights are links in a chain that allows building multiple textual representations extracted from the source text.

The Text Representation

The representation that the instrument according to the invention makes of text, has two characteristics:

1. It is hierarchical, almost pyramidal;
2. It is interconnected.

Use of the instrument according to the invention allows the reader to generate "interconnected" textual levels, each representing different yet linked synthesis/versions of the same content.

The interconnection is very useful because each segment of the text is connected to the corresponding segment in a different synthesis level, and so it is extremely easy—while browsing the text on a topic of interest—to move into a level where the degree of synthesis is less pronounced and with more details on the topic of interest, or vice-versa move towards a higher level synthesis, getting back up to the more general thread of the content.

Figure 2:
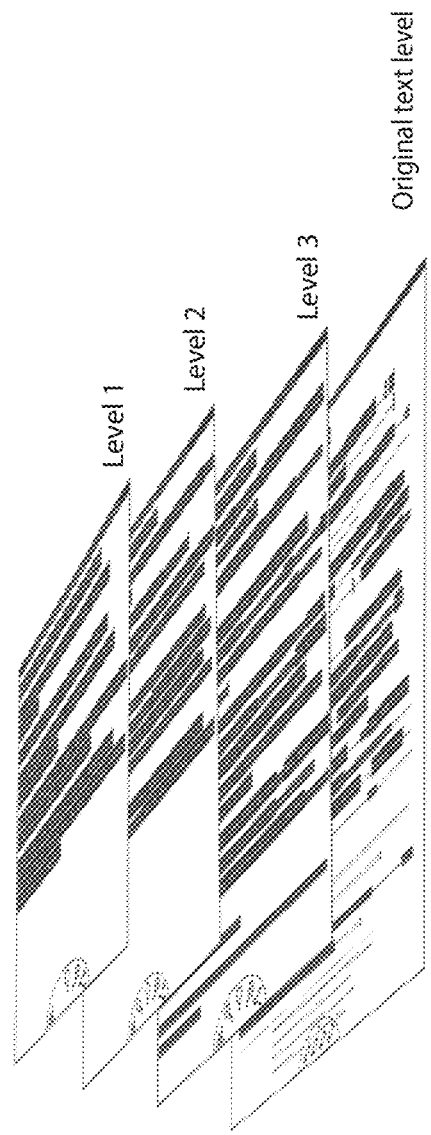
FIG. 2 shows a second representation of the "pyramidal" structure of the content obtained with the method according to the invention.

A first representation of this situation is shown in FIGS. 1 and 2. Later in this paper this aspect will be explained with greater detail and completed with an example.

Text Browsing

The document, generated thanks to the hierarchical highlights, has a pyramidal structure with the first textual level, the most synthetic one, as its peak, then goes down to a second level, then to a third and finally to the original text. It is therefore possible to expand a phrase (or other text unit or element) present in any of the three levels of synthesis created by the method according to the invention, and acquire such additional details as provided in the next level, up to the maximum degree of depth available in the text looked at. In addition to this, from each level—original text, third level and second level—the reader can go back to a more concise textual level.

Returning to highlights, the method according to the invention tracks the user's highlights thanks to a database that contains:

TABLE 1

| Record | Initial position | End position | Priority Level |
|--------|------------------|--------------|----------------|
| 1      | pos_start1       | pos_fin1     | 1 or 2 or 3 or . . . |
| 2      | pos_start2       | pos_fin2     | 1 or 2 or 3 or . . . |
| 3      | . . .            | . . .        | . . .          |
| 4      | . . .            | . . .        | . . .          |
| 5      | . . .            | . . .        | . . .          |
| 6      | . . .            | . . .        | . . .          |
| . . .  | . . .            | . . .        | . . .          |

The sequence of the highlights' records is kept aggregated for optimization reasons, yet this choice also allows to later represent text in the three levels in a manner consistent with the original version.

Since in the original content premises, statements of high importance, relevant information or asides tend to alternate seamlessly, maintaining the highlights records aggregated allows the method according to the invention to represent the different versions of the text (each with a different level of synthesis) maintaining its "narrative" consistency but eliminating details not strictly necessary in that particular summary, yet allowing the user to re-add them at will, with one, two or at most three clicks (or "press" on the screen of a mobile device such as a phone, tablet or e-book reader).

Creating a table for each level of emphasis—which would avoid the need for the "Underline level" that we see in Table 1—would make unnecessarily complicated the subsequent reconstruction of the summaries corresponding to each level. In any case this is one possible implementation. It has to be noted that what is here described as a database refers, in one embodiment, at three different alternative tools to record the data: the first consisting of a real table as in Table 1 above, or Table 2 as shown later; the second consisting of a vector variable; the third and simplest consisting of a string, suitably constructed (the list of highlights can contain, for each single highlight, information such as the ID or unique identifier, the start and end position with respect to the original document, and the style/priority of the highlight), thanks to which you can keep track of the highlight data and their levels, necessary for the invention.

All these solutions are obviously possible, and the choice between them depends on the requirements of the version of the invention. This is usually influenced by the type of device on which the application is expected run, by its power, by the fact that the application can run native or within a browser, by the required speed and computing power that is estimated for the devices on which the app or the client-side process is being used. In this sense, the currently most used version, as mentioned elsewhere in this text, is the Light one (where one single text representation that contains all the user-highlighted text is used, and where each respective portion of highlighted text is appropriately formatted), as it allows for considerable speed and works on almost all recent browsers in Web-app form, which results in a user experience similar to the Apps one, without requiring an installation.

Representation—Standard Version

Once a user has completed highlighting a text, the instrument will provide a representation of a number of new textual levels equal to the number of Priority Levels chosen, which in the example are 3 (the fourth marker in the figure is the eraser).

Figure 3:
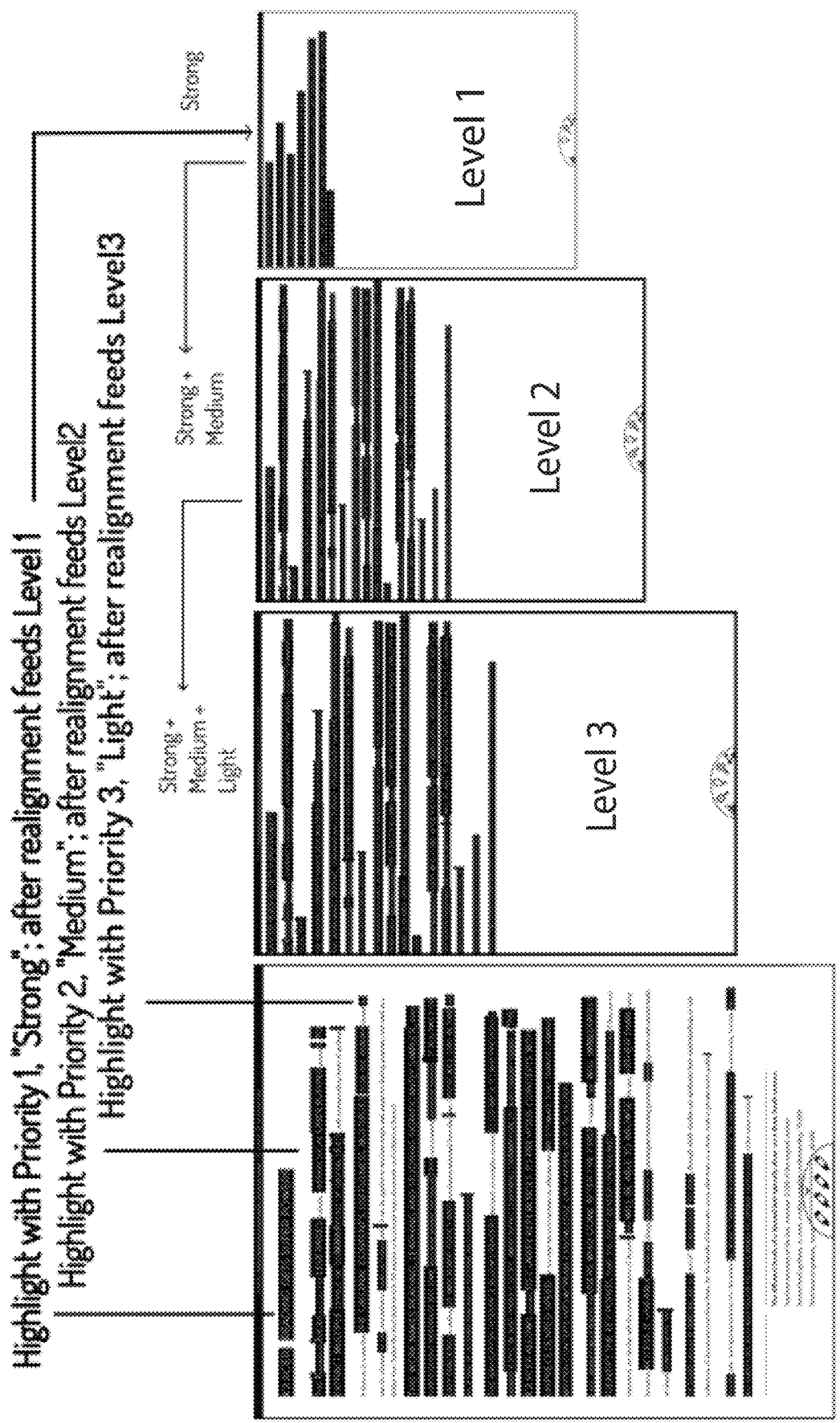
FIG. 3 shows an implementation of the method with the use of a database according to the invention.

Representation of each layer of text can then take place in a pattern that follows what was anticipated in FIG. 3:

The first level of text will be created by extracting the text highlighted with Priority/Level 1 (text represented with largest fonts on black background highlights, in FIG. 3). The tool corrects the text representation so as to not separate any sentences or paragraphs that were whole in the original text, or by separating with appropriate newlines, paragraph or breaks sentences and paragraphs independent of each other.

The second level of the text and the following ones will instead be represented as a "summation" of the texts corresponding to the emphases of the first level and all of the levels up to the Priority Level that needs to be represented. Also in this case the corrections are applied so as to not separate sentences or paragraphs that were whole in the original text, or separate with appropriate newlines, paragraph or page breaks sentences and paragraphs independent of each other.

Figure 13:
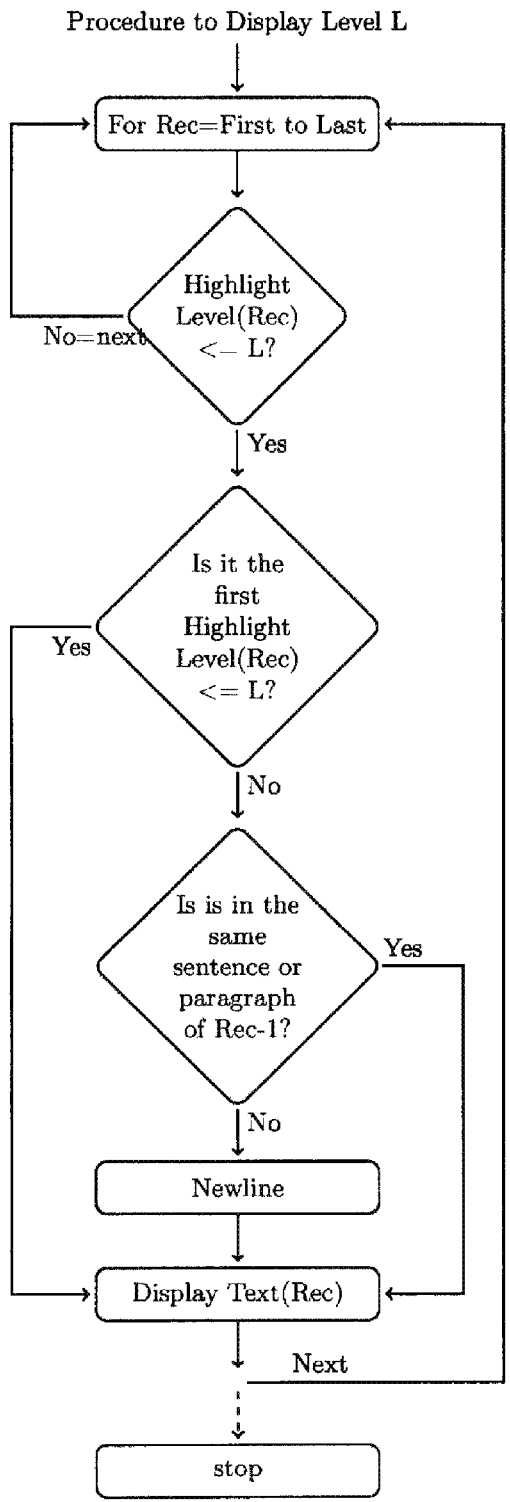
FIG. 13 shows a diagram flowchart of the method according to the invention to represent the individual additional textual levels in the standard version.

FIG. 13 shows a diagram flowchart of the method according to the invention to represent the individual additional textual levels in the standard version. The mechanism described in the flow chart requires L as an input, or the Level that the user wants to be represented.

Representation—Light Version

What shown above can be achieved thanks to web technologies in a way that in some ways represents the reverse of the first: instead of proceeding by adding chunks of text that you want to represent, you pre-load all the highlighted text and show only what is being requested by the user. This second method is employed in the current version of the prototype of the instrument according to the invention.

Such version is lighter—it ensures greater speed and minimizes client and server traffic, which interact only to save the user's highlighting work—but it could be problematic in case of a requirement to "show" only a specific level of synthesis but not all of it: with this system the browser or application "loads" the entire synthesis, which therefore passes through the end user's machine, and could easily be intercepted.

As anticipated the "Light" version creates one single text representation that contains all of the text highlighted by the user. A (CSS) style is then assigned to each text portions characterized by Level 1 (Style 1, which in the example is represented as the largest font on black background), another style to the portions of text that have been underlined with Level 2 (Style 2, medium sized fonts on black background), and a third one for text classified and highlighted with a Level 3 priority (Style 3, smallest fonts on dark background). At this point it becomes possible to choose to represent just the text marked with the (CSS) Style 1 to get the most concise summary, or to represent text marked with both Style 1 and Style 2 to obtain the second level of synthesis, or show all three styles at the same time.

In this second version of the tool according to the invention, representation takes place in two phases: first the text is processed/prepared and a style is assigned, and a second where the invention displays only the portion required by the user. Both phases can occur at the Client side, as the highlight data, after being synchronized with the server, are available locally.

Preparation of the Synthesized Text

In the first phase a page containing all of the highlighted text is prepared and, to each text corresponding to a highlight, a Style is attributed, that will be graphically represented with a colored background (in our figures: it is differentiated with a black background color and a different font size), for the characters of the relevant text portion. In our example, where the highlight levels are three, there will be three Styles associated with them, and in the new page the representation of texts highlighted with priority Level 1 will be displayed with a black background color (which then appears as a highlighted) and a large font, while levels 2 and 3 will be associated with a Style 2 and a Style 3, which correspond to a medium and small font, both with black background.

Please see FIG. 5 to gain a better understanding of the preparation of the new page, which will allow subsequent representation of the 3 levels of synthesis.

Representation of a User Requested Text Level

The preparation of the extracted text, or the operation described in FIG. 5 (preparation of the text), occurs at the level of the client as soon as the user asks to view one of the levels of synthesis. It will however take place again, in the event that the user, after asking the first synthesis, decides to alter or mark new highlights. In this way the summary versions of the texts will always be updated.

Figure 4:
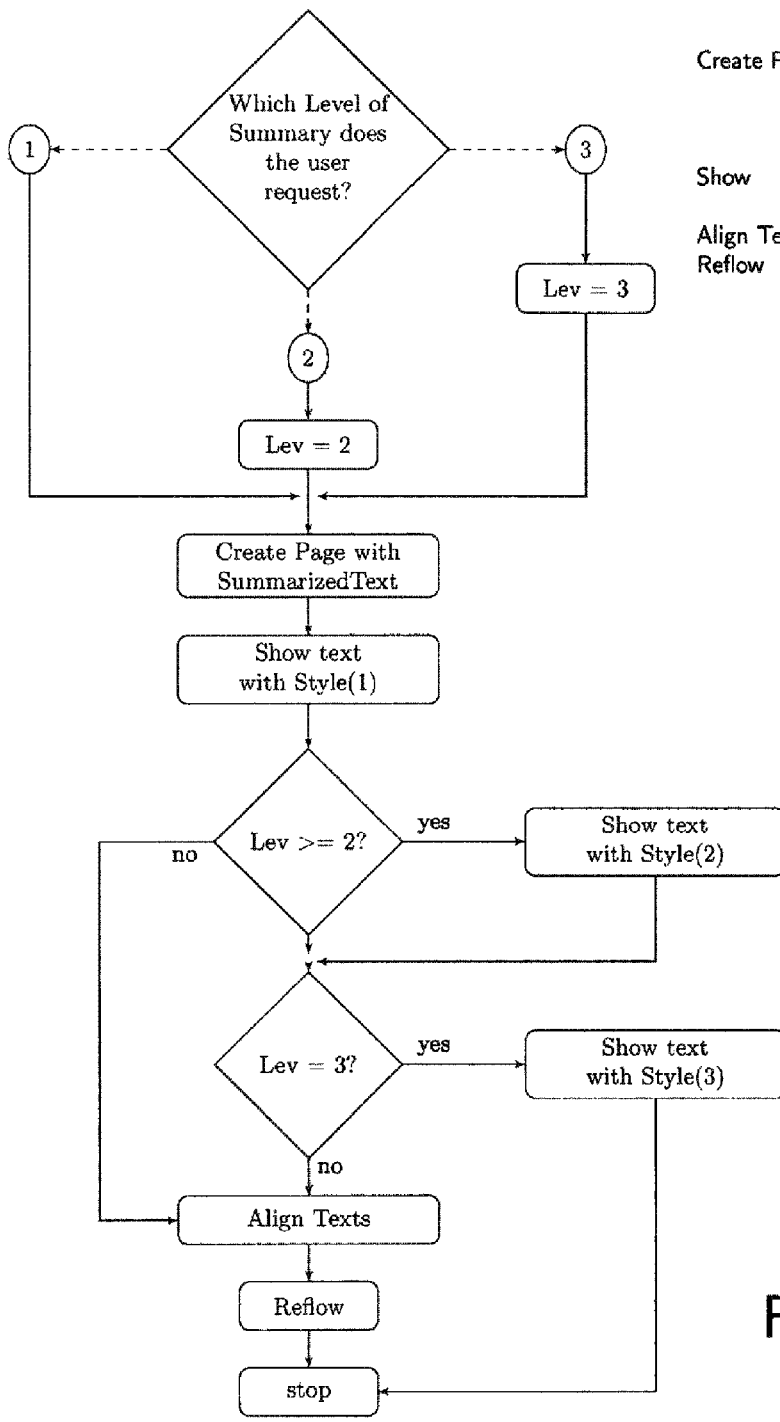
FIG. 4 shows a diagram flowchart of one embodiment of the method according to the invention.

Once the document named "SummarizedText" in the diagram of FIG. 5 is obtained, the method according to the invention is able to represent it. The representation will take place according to FIG. 4.

The text that the instrument, the object of the invention, will show to the user is then updated each time the user requests to view a different synthesis level. The user can express such a request—in this version of the invention—in two ways:

by pressing the buttons marked by the lenses with the "plus" and the "minus";

by clicking on a phrase of interest.

The user at any time can then choose to move from the original text to a more concise version of the text, and vice-versa. A more complete and detailed description of this mechanism will be given below.

Alignment of the Texts—Reflow and Text Align

If the level of synthesis shown were different from Level 3, two additional steps are required to maintain readability of the text.

Please remember that all of the highlighted text is re-represented in a new, single page in advance, i.e. before showing it: if level 1 were shown, for example, all of the phrases, words, carriage returns, etc. corresponding to levels 2 and 3 would be hidden, leaving empty spaces in missing parts.

To maintain readability it is therefore necessary to apply a "reflow" to the result, a service provided by the browser while applying the Style. It consists of bringing each text element, shown in this case, close to each other to make them appropriately and consecutively represent the content that the user will read. The procedure could also be described as the removal of the empty spaces between one level of highlight and the other. In practice, if the user asks to display only Level 1, the shortest summary, the process of reflow will combine all the sentences highlighted with the largest font on black background in the enclosed figures one after the other, eliminating any empty spaces that might separate them. If the user were to choose to display the second level of synthesis, instead, which as seen above is constructed as the sum of the texts corresponding to highlights with priority levels 1 and 2, the reflow will bring together these texts, eliminating the blanks. In this last example the blanks—being the summary page built as the sequence of all highlighted texts in their original order and independently from their respective level of emphasis, as was shown for the construction of SummarizedText (see. FIG. 5)—would consist of the texts that were highlighted with priority Level 3, the smallest font on dark background, which should not be shown. The procedure of text reflow is a reasonably common practice, and is used both to adapt texts to different screen sizes, or to make readable documents that by their "nature" might be static, like PDF files.

Also, in order for the text to be distributed correctly in levels 1 and 2, you need to make adjustment to "paragraphs", mentioned above in the description and schemes of the Standard Version. In this context, we call this further rectification "Text Align."

Again, for Level 3 both of these operations are not necessary: SummarizedText was already built with all of the underlined text, and so it is compact and readable both by users and by machines. Furthermore, insertion/deletion of "breaks" has been shown in FIG. 5.

Figure 6:
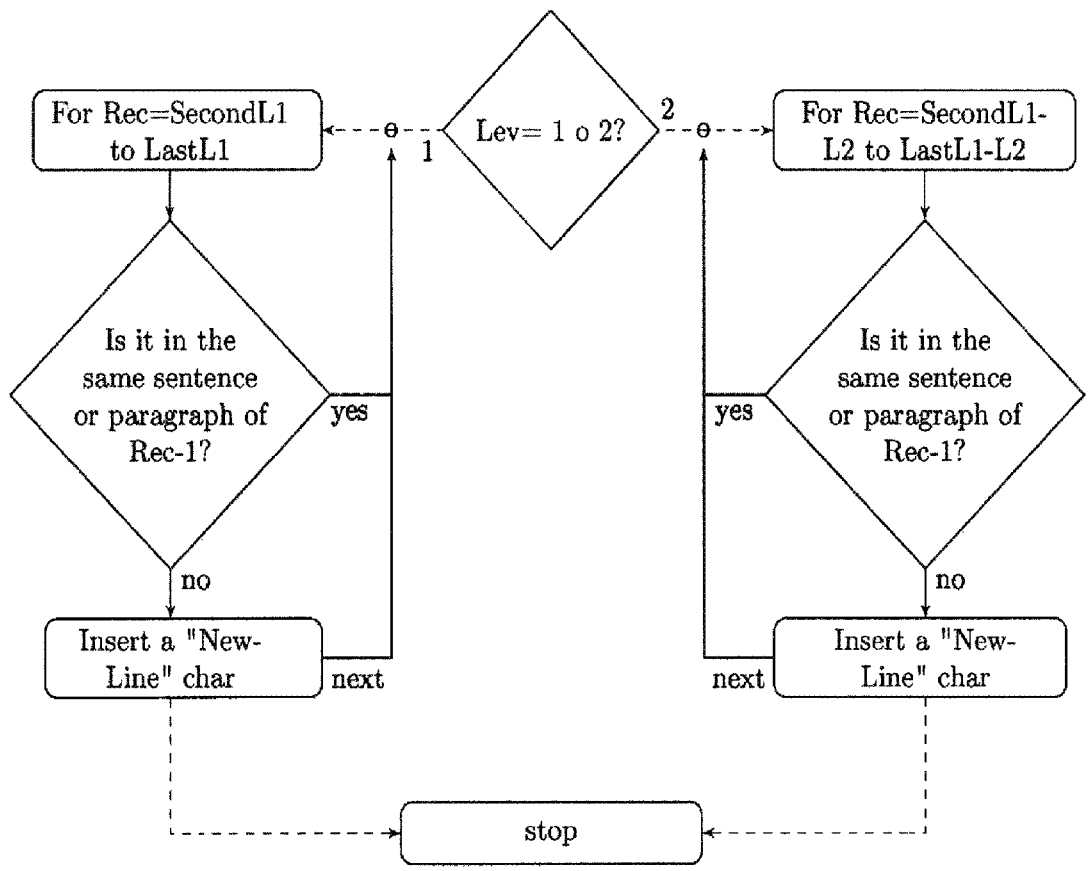
FIG. 6 shows a diagram flowchart of a further different embodiment of the method according to the invention.

Insertion/deletion of "breaks" to layers 1 and 2 of the summarized text is instead described in the flow chart of FIG. 6.

Browsing

A key element that allows the instrument according to the invention to constitute a significant technical aid is browsing of texts. As mentioned briefly in the instrument's description—following the use of the method of prioritized highlights on a digital text, bundled with its associated data structure and their representation by the methods described above—the user "structures" the text, which was originally distributed only on one flat plane, on more levels. Each level of the structure, taken alone, constitutes a complete and readable text, and in the simplest case of use constitutes a summary of the subject described (even the original text can conceptually be represented as a synthesis of the subject analyzed). Already the fact of having one, two, three (in the example described here) or more summaries in addition to the original text is a valuable result, since they allow to return to the subject in a significantly reduced time compared to the full initial read. The value of these "new" texts increases, however, and very considerably, if the reading, in addition to being performed on a single plane, can be done also by smoothly switching from one plane to another. FIGS. 1 and 2 already gave a visual indication of what is described here, but it's worth doing a more detailed example to convey the idea of the mechanism, before seeing the constructive part.

Browsing Example

Since in this example we are interested in analyzing the browsing of the text after the structure of the same has been created thanks to appropriate highlights, we will assume that our user has three textual Levels generated by the method according to the invention, as described above, already available.

Suppose that our user is interested in reading the book "The Cathedral and the Bazaar", an essay on software development written by Eric S. Raymond describing the world of Open Source software. In the book the author explains how Linus Torvalds generated an entirely new development model for software, and attributes to it the name of "bazaar" because it is transparent and always open to anyone who wants to contribute to the improvement of the final product, as opposed to the "cathedral" model, in which a company that builds a new program does so inside a construction site, closed to non-authorized personnel.

The method according to the invention allows to our reader to approach the book in a different way, because he has several alternatives available: read the full version, one of the summaries, but also browse the text. Our example focuses in particular on this last approach.

Figure 7:
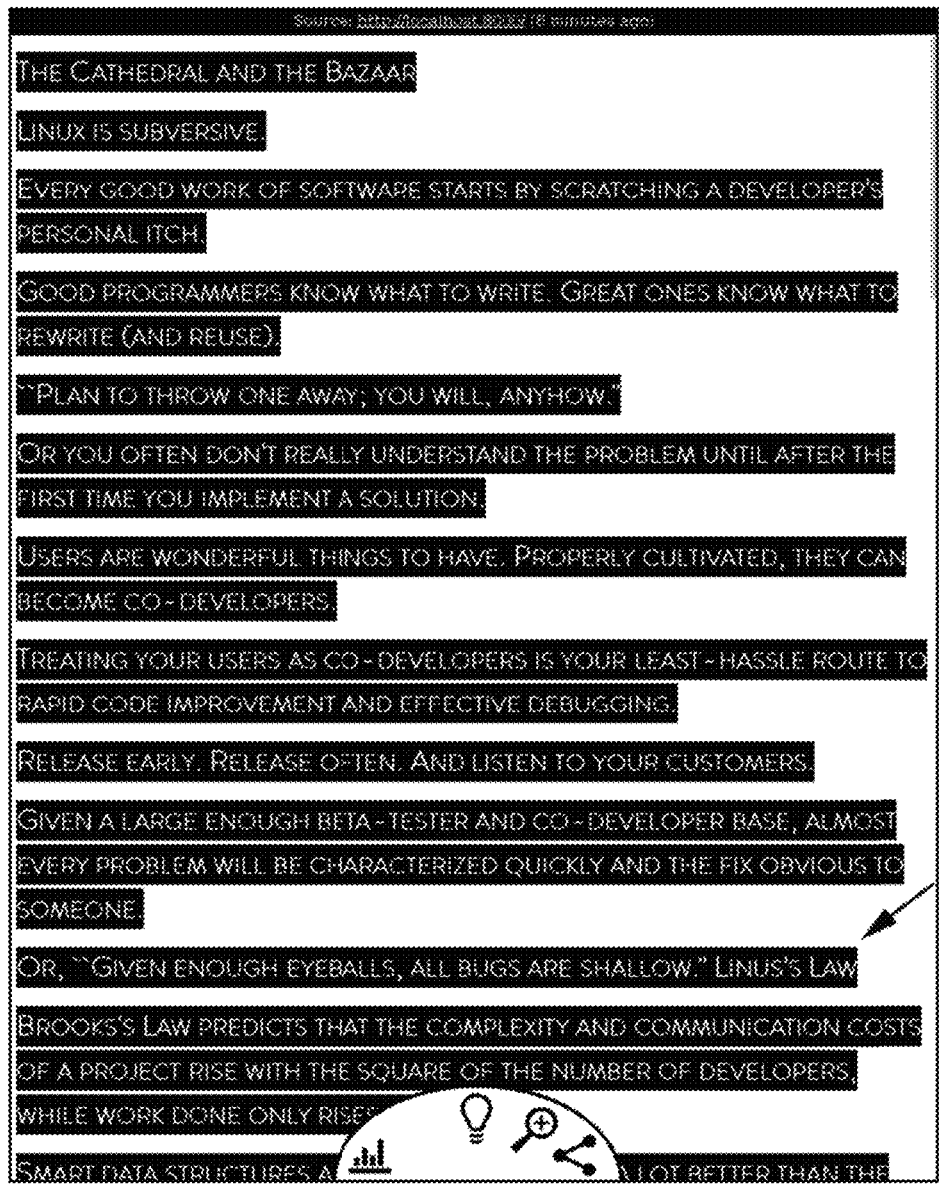
FIG. 7 shows a representation of the text obtained by the method according to the invention at the first level of synthesis, with a phrase of interest marked (indicated by the arrow)

After having read the first few sentences of Level 1, generated by the method according to the invention, which as can be imagined is composed only by text highlighted in large fonts on a black background in the example, our reader is struck by a sentence, e.g. the one marked with an arrow in FIG. 7.

The method according to the invention allows our user to explore in more detail that particular statement: clicking on the element just identified, the instrument will show the same sentence but in the context of the next level, flashing it briefly to allow for immediate identification.

Figure 8:
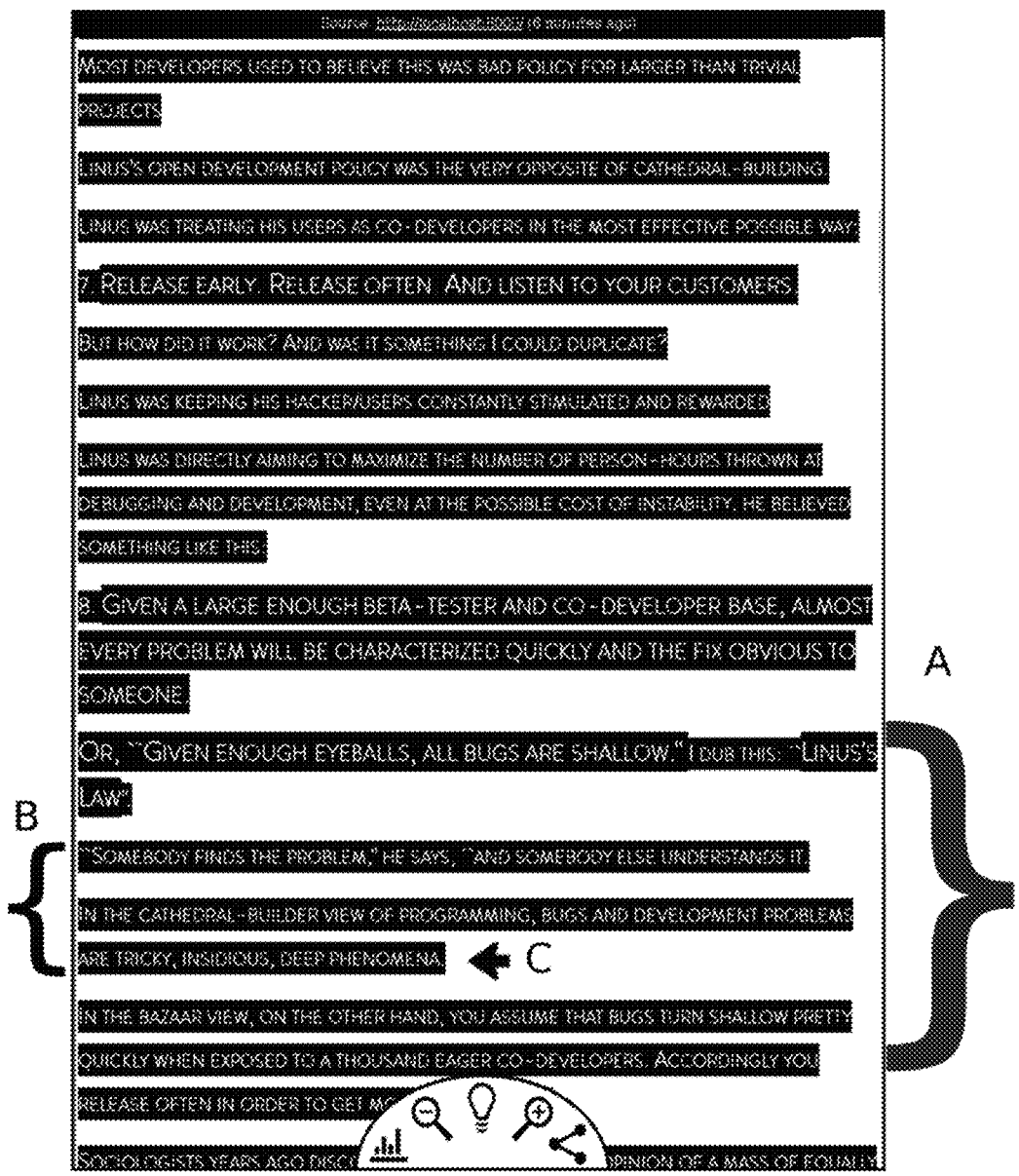
FIG. 8 shows a representation of the text obtained by the method according to the invention at the second level of synthesis, with some parts of interest marked.

In FIG. 8, the paragraph identified by the large brace, marked with the letter A, shows text highlighted with a medium font on black background by some previous user, corresponding to Level 2 in the our schemes, around or (as in this case) after the sentence which attracted the attention of our reader. After reading the section, our reader finds some other content that allows him to elaborate further on his point of interest: the part indicated by the smaller brace, marked by the letter B. Among these phrases he chooses to expand the portion of text marked with the arrow of letter C by clicking on it.

Our reader by the way is aware that all the text of the level where he is currently reading before clicking and zooming further is also represented and easily identifiable in the next level: Level 2 sentences remain present in Level 3—because this last level is built by adding the text highlighted in large fonts, the ones identified by medium fonts and finally those pertaining to Level 3 that will be represented in the smallest font on dark background (like level 1's and 2's backgrounds)—and the differences in fonts makes the text of each levels well distinguishable when represented in Level 3. So by choosing to click on that phrase of level 2 he can still then identify texts coming from Level 2 while having "dropped" down to level 3.

Figure 9:
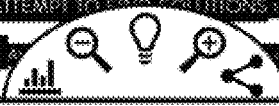
FIG. 9 shows a representation of the text obtained by the method according to the invention at the third level of synthesis, with some parts of interest marked.

By clicking on sentence "C" in the figure, the reader will be sent at level 3, this time. Referring to FIG. 9, the method according to the invention will show at this point the textual representation of level 3 and, after briefly flashing (optional) the sentence that our user chose with a click on level 2 will allow the reader to read further. In our example, the reader finds some more elements, those shown in the figure marked by the letter D. He then tries to see if clicking further can get him additional information, and chooses the phrase indicated by the arrow as letter E.

Figure 10:
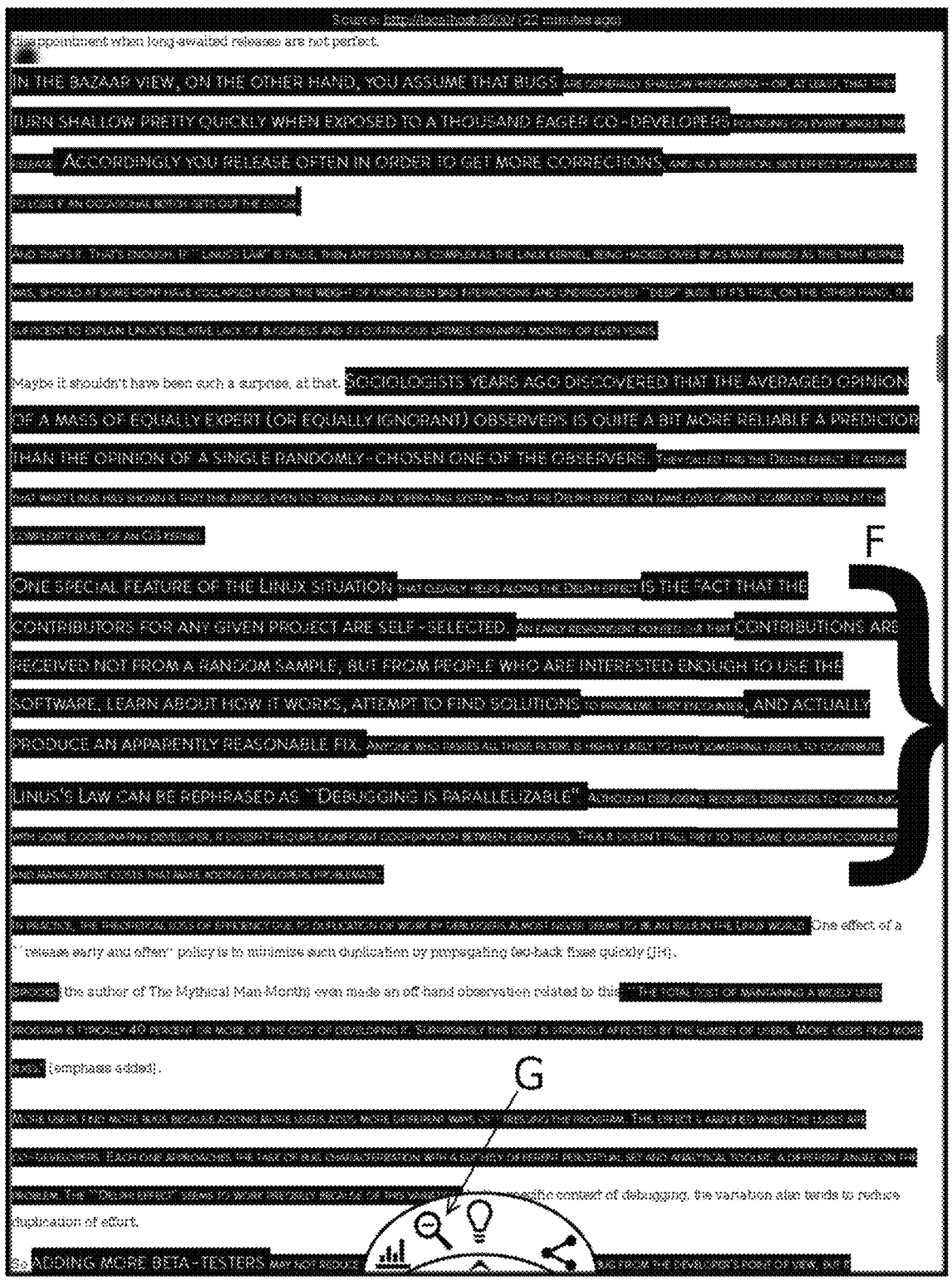
FIG. 10 shows an original representation of the text obtained by the method according to the invention that includes the base text, with some parts of interest marked.

At this point the method according to the invention will show the original text, complete with its highlights, as shown in FIG. 10. It's important to remember here that for "highlights" any method applied can serve the purpose, be it highlighting in a different color, underscores, bold, font sizes as in our figures, or any other graphics apt to the purpose.

Again a brief flash of the sentence found and clicked on Level 3, allowing it to be recognized in the original text, will help the reader to quickly identify the relevant paragraph, the one highlighted by the brace denoted by the letter F.

By pressing the lens identified by the arrow and marked by the letter G, our user can go back to previous levels, keeping the point of his read in the process like it happened before, while he was increasing the zoom. Optionally, the phrase that was last selected will blink in the previous level, and if its highlights are of a lower level than the destination one, after flashing briefly it will disappear, leaving visible only the text portions of the chosen level.

At any time the user can use the "+" and "−" lenses to increase or decrease the zoom on text by switching level, as if browsing a map. If before operating the zoom the user clicked on a portion of highlighted text, that point will become the reference for the method according to the invention to bring the user to the location corresponding to the highlight in the newly selected level. Otherwise the "+" and "−" lenses will simply change the displayed level, down to the most comprehensive textual representations with the lens marked with the "+" button, and going towards the synthetic levels by pressing the lens marked by "−".

The instrument according to the invention therefore interconnects the various textual summary levels between them: each highlighted element maintains a "relationship" with both the textual level of higher and lower level, as well as with all the others thanks to the information contained in the database. This turns into a considerable advantage in terms of fluidity of experiencing the text, which is no longer an interminable sequence or words to be read one after the other in order not to lose track of the meaning of the content, but becomes a zoomable resource as if it were a map.

The advantages of the instrument according to the invention are all related to its use and mostly immediately apparent upon use itself. Among them, we report two particularly important ones.

First, the user that highlights the text will benefit very significantly from the structure that he creates as he goes through his reading, and this advantage will be greater the more complex is the document that he works on. This is because as soon as the content of the latter will refer to any element explained in previous parts of the document, the reader will be able to return back to his notes/highlights with the zoom-out mechanism (the lens with the "−" sign), identify the part where the element in question was located and possibly zoom-in on the relevant chapter-paragraph-sentence, and recover in just a few clicks the complete explanation without further research. During development testing we observed that this option makes learning of texts and complex subjects much quicker, and it might speed it up to 5 times faster.

Secondly, one of the considerable advantages for subsequent readers manifests itself in particular for those who already know the subject matter of the text: in this case the reader that enjoys a version of the text prepared according to the invention can jump with considerable confidence all parts that he is already familiar with. In fact unlike an index which tends to represent mostly a collection of titles that only anticipate the topic that will be discussed, the highlighted sentences tend to describe the core of each section. Where these sentences are already clear to the reader that follows, he can afford to fly over them sparing himself from reading parts he already knows and focus directly to the innovative content or those sections he is unfamiliar with. Let us analyze how the method according to the invention obtains this result.

Identifying the Highlight being Clicked

According to one embodiment, the highlights are composed of several parts, as many as the elements it is composed of: if, for example, a highlight starts in a paragraph and ends in the next, there will be two parts. This fact is due to the internal operations of the highlighting system, which operates respecting the tree structure of the (X)HTML document (W3C standard, which requires that the opening and closing of a tag takes place within the same parent element).

To obtain browsing as described above, you must correctly identify where the user clicks, or presses on the screen in the case of a mobile device; here we intend to describe also this second alternative of pressing on the screen of a touch screen device.

The identification is facilitated by the fact that browsers have an "on_click" event that returns the Style element clicked, which corresponds to the highlight. The identifier of the highlight (also called "pointer") is then expressed uniquely by a pair of values, which represent:

1. the position of the part affected by the click event in question within the list of the parts belonging to the same highlight, and 2. the position of the highlight to which the part belongs within the list of all the highlights.

1 and 2 are in fact the elements of the pointer which then enables browsing within the text, based on the user input.

Positioning of the Affected Portion of Text at the Center of the Screen

After obtaining the information referred to in the previous sub-paragraph, the application will update the text representation according to the new Level, and show the greater level of detail, positioning itself thanks to the pointer, as described in more detail later: if we start from Level 1, when the user clicks on a sentence, the invention will then show Level 2; in case we start from Level 2, it will then show Level 3 and so on, down to the level of the original text; in this last level a new click will simply set a new starting point (and constitutes an act of updating the pointer), which will come of use in case the user asks to go back to levels with fewer details by pressing the lens button with the "−" sign.

Being able to trace, as described above, the portion of interest of the reader in the text and thanks to the data that represent a pointer, the method will then represent the next level, perform a scroll (move the text until it is positioned where desired) until that same portion of text is located at the top of the screen, then it will perform a further scroll to bring it down by an offset (a fixed number of lines) that positions the text just above the middle of the user's screen, and will finally briefly flash the portion of text identified thanks to the pointer, so that it is easily identifiable by the user himself. It has to be noted that the measurement of the offset, that is, how many lines the text will scroll down in the second scroll described above, is dynamically determined from the information that the user's device provides about the approximate size of the screen, or of the portion of it on which the text is represented.

Client-Server Interactions

Figure 11:
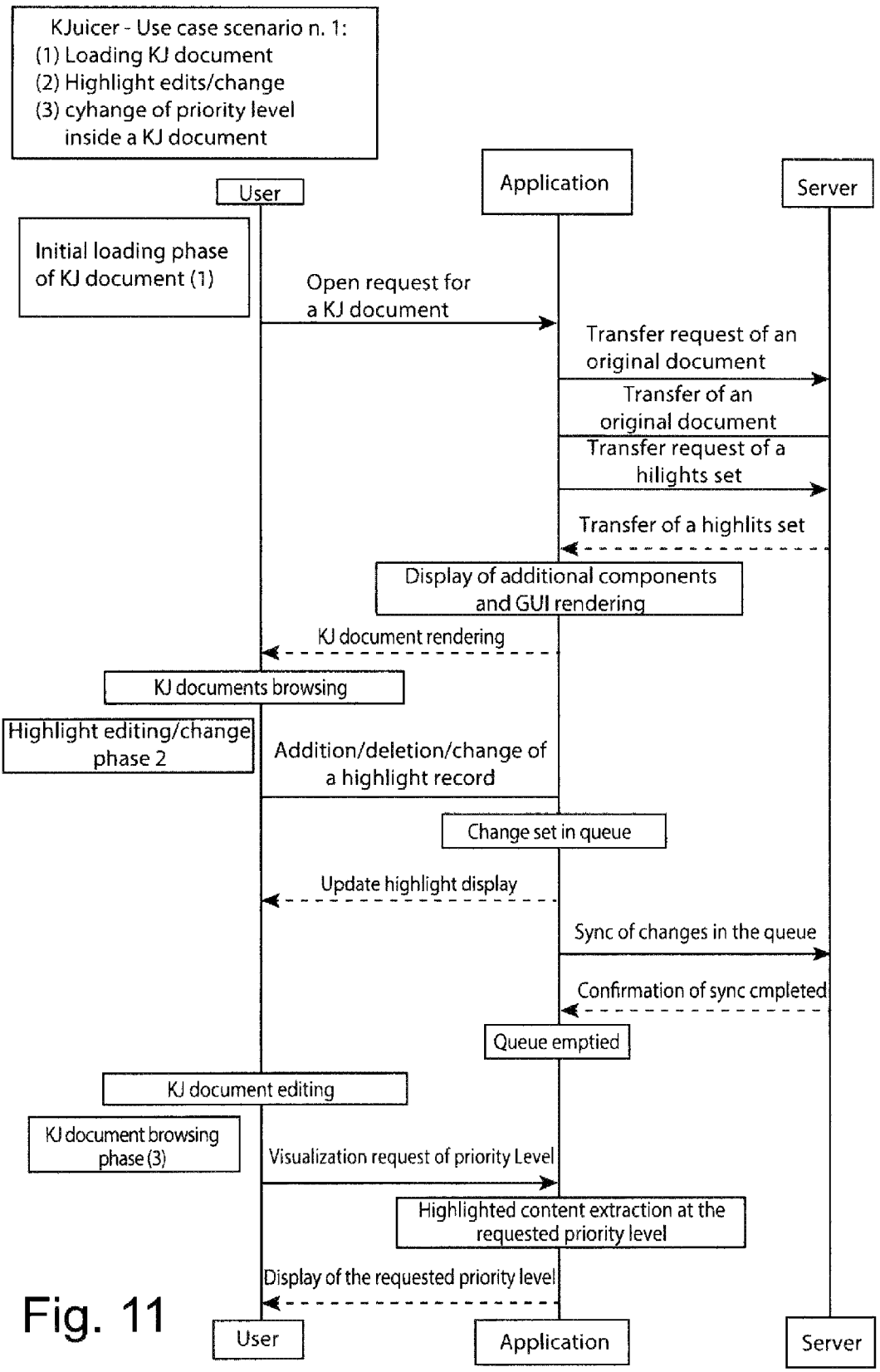
FIG. 11 shows a diagram flowchart of a functioning aspect of the method according to the invention.

FIG. 11 shows a diagram containing the interactions that the Light version enacts between server and client.

Inserting New Text Components and Modifying the Text of a Level

The method according to the invention optionally additionally allows you to make changes to the texts resulting in each layer. This is to allow for smoothing out imperfections in the resulting summaries, or integrating additional content. Of course it is left to the user to choose if and how he wants to make use of this possibility, and the results from such action may modify the meaning, but in this case the user bears the responsibility. However during personal use it is totally reasonable that the reader might draw conclusions that differ from those of the original author, and other users might have the ability to express appreciation or lack thereof of the summaries made by the first reader, "alerting" others who will follow.

Formatting

Since the hierarchy inherent in the method according to the invention is very well suited to create structured texts, it is natural to provide the ability to format such text in order to make it even clearer and easier to understand.

With this option, it becomes simple to transform a linear text in slides for a presentation. See FIGS. 12 (*a*)-(*c*).

While entering text or formatting in a standard document is a known technique, the possibility of combining this technique to an already hierarchical text on several levels—as described above—allows for generating from the original content results otherwise obtainable only with a far greater number of steps and at the price of many manual operations, typically copy and paste, repeated and repetitive.

A Structure to Expand the Contents of the Original Text

Natural complement to the functions exposed so far consists in the possibility of making notes, which takes place in the traditional way.

The instrument according to the invention, however, added a mechanism of Levels of textual representation, and therefore it is also possible to complete a text by literally inserting additional material, which will add up to the original text and create an expanded version.

The difference with the above function, the modification of the text, lies in the goal for which the text is inserted, and in how such addition is treated by the instrument according to the invention: the case referred to above involved changes to adapt the text of a specific level according to the user needs; in the present case, however, the user can create one or more Additional Levels, intended to host new text entered by the user, in order to complete and expand the original content.

Returning to the example with which we have so far shown the tool according to the invention, if our user adds text to the Original Level he is granted the ability to create an Additional Level to the collection represented by the original text and the derivatives, the extracted Levels generated thanks to the highlights and described thus far. He finds himself at this point with the possibility to have—and therefore potentially being able to share—a structure, again pyramidal, composed by 5 levels, for example: Additional Level-Level of Original Text-Level 1-Level 2-Level 3.

From an internal point of view once this addition is potentially rather simple to obtain, since the Additional Layers can be treated as the new texts that will be saved on the server. This possibility is granted by the fact that the text is added, and not pulled out and "made it disappear" as in the representation mechanism described above. This mechanism is perfectly suited to the above Light Representation, which uses a vector variable to identify the locations and highlights level, but the variable used to store highlights is not particularly suited to contain additional text.

Instead a more efficient and robust method is used—especially in terms of storage space—to get to the result, by expanding the database to allow it to contain the user-entered text. The Descriptive Database Table 1 is then modified as follows:

TABLE 2

| Record | Early position | Finishing position | Underlining level/ Extra | Optional Additnal text |
|---|---|---|---|---|
| 1 | pos_iniz1 | pos_fin1 | 1 or 2 or 3 or . . . | NA |
| 2 | pos_iniz2 | pos_fin2 | . . . −2 or −1 | "XYZ" |
| 3 | . . . | . . . | . . . | |
| 4 | . . . | . . . | . . . | |
| 5 | . . . | . . . | . . . | |
| 6 | . . . | . . . | . . . | |
| . . . | . . . | . . . | . . . | |

As the reader may have already guessed, when in the field Highlight Level/Additional level a positive number is present, the Record describes a highlight that pertains to the original text with a priority equal to the value of the field Underline level, so the corresponding field Possible Additional Text will not be populated. When the field Highlight Level/Additional level will be populated by a negative number, instead, which indicates an Additional Level, this will lead to an Optional Additional Text field, populated by the portion of text that the user entered.

In this way the Standard Representation (with the database) above is not modified in any way, but the user with the method according to the invention acquires a very important possibility for himself and potentially for many other users: add additional richness to content keeping it well separated from the original even if jointly readable and browsable with the method according to the invention's tools. This last detail is very interesting to create material that enriches the original text, allowing the user to add it for himself or for others.

Autonomous Levels

With Autonomous Layers we mean any levels corresponding to highlights that are not "connected" with the ones described so far but independent.

These additional highlights may be single—and generate an autonomous textual excerpt—or connected with other levels and thus provide an alternative path to the main reading.

In the first case, extracting such text does not represent a claim to the present request in that it is a known technique, and in itself does not constitute an innovation, but the coexistence of a second set with the main reading one does constitute an additional possibility for the user.

In the second case, the interconnection with other Highlight Autonomous Levels may allow users to make a very sophisticated use: think of a text dealing with a complex subject as a proposed merger between two companies. Such a text can be highlighted/underlined by different users such as legal, marketing experts, experts in production and even IT managers, and these users will be able to highlight to those who will decide on the merger proposal—be it the Managing Director, Board of Directors or the Shareholders' Meeting—what they consider important, perhaps completing the highlights sets with their considerations. In this way the initial text, open on a number of instances equal to the number of versions desired, can be re-represented in different ways to serve purposes and address issues noted by the various specialists. Browsing of multiple levels of synthesis, however, would allow decision makers to capture a taste of their collaborators' considerations without having to re-read text and assessments from start to finish every time, making the overall assessment much smoother.

The single document then becomes the subject of specific and specialized reading vantage points, functional to a more articulated understanding and from different points of view. In addition to this example, the same methodology can be imagined as applied to medical records of "complex" patients, being read, "highlighted" and therefore interpreted by different specialists who look after specific diseases and symptoms for the benefit of a patient, the patient's family and other colleagues who take care of the patient. All specialists can allow others to understand their therapies and the main doctor could coordinate their action.

Mix

The further, optional "mix" feature is available, to allow the user who builds a reading path to alter the narrative structure of the text, creating a variant. In this case the user who will benefit from the work does not follow the original authors logical path, but the "Master" users, the one who created the Mix. The usefulness of this feature is evident when you consider for example a teacher who chooses to address issues of the original text in a different sequence for pursuing the specific educational aims of his class or course.

In terms of construction the Mix function consists in the generation of a new table of the database which will coexist within the main database, similar to that described previously in Table 2. This new database is populated thanks to a "drag and drop" graphical interface, that allows the Master user to drag texts portions together, taken from the level of the original text or any of the highlights levels, inside a new text. The new text remains associated with the original one, so that, although its portions have been moved, it is always possible to the final user to recover the original content of the various pieces combined, if he wants or need them.

Remix

The further, optional "remix" functionality is similar to the previous one, but allows for the mix starting from different texts already structured with the method according to the invention, creating a "remix" work. Also in this case the aim and the need that generated this solution come from the teaching field: it is very frequent for teachers to articulate their courses extrapolating portions of different texts.

The considerable advantage coming from making this operation with the aid of the method according to the invention consists in the fact that Remix of texts becomes a single resource, usable in a very simple way on a single interface that enjoys the benefits already described above: it is hierarchical, it allows for different reading speeds thanks to the summaries corresponding to the levels, and the non-linear exploration. All while remaining connected to the source of the course texts and therefore easily enabling expansion of research for students.

Log/Tracing the Activity of Users for the Purpose of "Gamification" and SEO or Other A further optional feature of the tool is the ability to track the browsing of a user or users, collecting their interactions with the user interface of the tool in the form of data such as the number of clicks, their location, the times at which they occur as well as their frequency, etc.

This feature is of value to acquire a very wide range of information, among which:
  Understand the effectiveness of the original text;
  Understanding the effectiveness of a, or the, hierarchical structure obtained thanks to the instrument;
  Understanding which parts have been the subject of interest from the users;
  Understanding which parts of the text or of the hierarchical structure have better chance of having been understood by readers or users;
  Which parts may need to be revised.

Additionally, this specific function allows to power and feed so-called "gamification" mechanisms, i.e. the use of games' mechanics and dynamics like levels, points or rewards, specifically applied to reading environments, in order to create more interest or solve problems or promote the reading of low interest content. This function makes it possible to know which topics the reader/user explored, and it becomes easier to reward his "research", provide him with feedback, compare his performances with other readers' ones, rewarding behaviors or characteristics of his reading, like completeness, speed, browsing pathways and so on. The invention solves one of the major challenges in creating gamification tools, which is precisely the way to collect items to "evaluate" the users' performance, in the context of studying, in which the gamification has so far failed to achieve particularly interesting results.

Collection of such data can also be aimed at exporting data of user clicks in terms of frequency, words and text parts coordinates and content, in order to optimize SEO (Search Engine Optimization) strategies. These activities are aimed at achieving the best detection, analysis and reading of pages or web sites by search engines through their spiders, in order to improve (or maintain a high) positioning of pages in response to users' web queries. These data sets, which can translate into keywords, are the subject of considerable interest and value for such activities.

A different embodiment of the present invention provides that everything happens on the user's computer, "locally", by saving highlights data in the browser cache and using a string inserted at the end of the web address of the page (known as "hash") to which the instrument according to the invention is applied. This version allows for getting the results effectively, but it is characterized by some important limitations, including:
  1. Any unexpected click can partially remove the highlight work, if the browser history has not recorded the corresponding web address change;

2. The involuntary closure of the browser or its tab containing the analyzed web page can cause the same damage;
3. In case of long original texts, the string containing the highlights may become too long as well, making it difficult to use the link;
4. In some cases, browsers may not support the long links generated by the highlighting. E.g. Safari, the Apple browser, usually "cuts" links longer than a certain length, resulting in an error and making this version of the tool inoperable.

Further Embodiment

The method according to the invention is implemented by computer, to extract summaries of different level of relevance/synthesis from an electronic text with hierarchical highlights.

First and foremost, the method requires acquisition and storage, on a physical memory of, or connected to, said computer, of a starting dataset comprising:
the relative coordinates of one or more highlights of descending relevance level in said electronic text;
one or more predefined values respectively associated with each of said one or more highlights, each default value indicating a level of relevance of the text.

Thereafter, for the highest level of importance, a portion of said electronic text—whose text elements are associated with a corresponding default value—is extracted, wherein said text elements in said portion retain the same relative or absolute position they have in the electronic text.

It must be said here that for all embodiments of the invention, if there are images in the text, they will be removed or left according to need, for example, they could be left in the same relative position they have in the original electronic text.

At this point, for each further priority level, a portion of said electronic text comprising or consisting of the text elements associated with such priority level is extracted, and added to all the text elements associated with all of the levels of higher relevance, wherein said text elements in said portion retain the same relative or absolute position they have in the electronic text.

In one embodiment, electronic text portions of these earlier stages are memorized on a physical memory of or connected to said computer, in the form of database or within appropriately configured variables.

At this point the method may be interrupted because it has already obtained the technical effect of producing hierarchical summaries.

The method may continue though, with the construction and storage, for each portion of electronic text pertaining to phase "D", of a corresponding portion of formatted text in which unnecessary spaces between the text and the new paragraphs are eliminated and breaks are inserted between sets of text elements belonging to different sentences in the electronic text, optionally inserting capital letters at the beginning of each sentence.

Portions of text were mentioned earlier, but it is possible also to generate corresponding whole texts, and then show just portions of them for viewing.

Finally, it is possible to display, on a graphic interface shown on a screen, the formatted text portion of step E, corresponding to a specific level of importance of said electronic text, based on a user choice.

The text elements of each level of relevance are usually but not necessarily displayed with different colors and/or fonts and/or background and/or size.

Once step F is performed, with the display of a portion of the formatted text, it is possible to successively display another portion of formatted text corresponding to a different level of importance, on the basis of a further user choice. This other portion of formatted text may be a portion of lower significance level of formatted text and said additional user choice is made via pointer or cursor on the graphic interface, the user selected text element being made to flash for a specified time in superposition to said other portion of the formatted text.

Optionally, other additional electronic texts can be stored in said physical memory, potentially using portions of said electronic text. To these additional electronic texts it is conveniently associated a respective additional level of importance, which the user can visualize as above.

The user can also create a new text, complete with hierarchical highlights, by combining the electronic text and the portions extracted as described above, with one or more other texts.

During execution of the viewing phase, data related to views of the portions of text with different levels of importance can be collected and stored.

The invention may comprise a computer program, made of code such that when it is executed on a computer system, it performs the steps of the method according to the above in the various embodiments, that may be combined.

The invention can also provide a computerized system, including at least one computer and a physical memory, in particular a client/server system, configured to perform the steps of the method according to the invention in one or more embodiments also in combination among them.

Implementation Example

In this example, the starting situation is an html page. Usage on an EPUB document would be very similar, as it would be in an XML document.

The target page is "inoculated":
1.1 processing of the page
   a) Analysis of the DOM of the page
   b) JavaScript code removal
   c) saving the remaining html in a new DOM
   d) id and record creation in the database:
      i. Document (new document)
1.2 Rangy is initialized with parameters:
   a) "N" layers (in this case: 3)
   b) Levels' tags: strong, medium, light
   c) Large, medium, small fonts, on black background
   d) id and record creation in the database:
      i. Document according to the invention (new cache)
1.3 creation and opening of a new html page according to the invention, with UI (user interface, GUI) that enables highlighting.

In the second phase, the user creates and completes the highlights. If he does not respect the priorities set by the system, the result will be useless.
2.1 The table "highlights" (see description) is gradually populated by the invention by interpreting the user's interaction, and the serialization of the highlights is slowly created, complete with priorities;
2.1.a) data is saved locally (real-time), within the same HTML page according to the invention, and
2.1.b) data is saved on the server (real time).

2.2 The table is used during the highlighting process to refresh the page's graphic style in accordance with the new user's highlights.

In the third stage, when highlights have been completed, a switch to display mode is performed:

3.1 From here the user can now browse the text and switch to the results of his work.

3.2 The results are ready to be created in real time on the user's request itself.

In the fourth phase, the user instructs for instance a switch to Level 1, large fonts on black background, priority strong.

4.1 The system creates a new html page from scratch, reworking the data:
  4.1.a) starts from a blank page (template),
  4.1.b) downloads the DOM of the processed original document from the server (see above);
  4.1.c) creates a new DOM based on the user request, in this case: level corresponding to large fonts on black background, high priority:
    i. analysis of the original DOM structure, and of its text
    ii. reconciliation of highlights
    iii. realignment of texts
    iv. color/font display
    v. inclusion of "strong priority" parameter inside the html of the new html page, which instructs the CSS to display only the portion of text marked as such.

In the next step, the user instructs a switch to level 2, large and medium fonts on black background, medium priority.

5.1 The system changes the html page requiring the CSS to display the medium mode, reworking data:
  5.1.a) inside the html DOM the CSS representation parameter is updated from "strong" to "medium" on the basis of the user request; in this case: medium and large fonts on black background, medium priority; thanks to the construction mentioned in paragraph 4.1, that sorts and tags texts and highlights with appropriate font/color information and priority, according to the method of the invention, the new representation will take place in real time with:
    i. highlights reconciliation, strong+medium
    ii. realignment of texts
    iii. Color/font representation.

Subsequently, the user instructs a transition to Level 3, large, medium and small fonts on black background, light priority:

6.1 The system changes the html page requiring the CSS to display the light mode, reworking data:
  6.1.a) the DOM's representation parameter is updated from "medium" to "light" based on the user request, in this case: large, medium and small fonts on black background, low priority; thanks to the construction mentioned in paragraph 4.1, that sorts and tags texts and highlights with appropriate font/color information and priority, according to the method of the invention, the new representation will take place in real time with:
    i. reconciliation underscores: strong+medium+light
    ii. realignment of texts
    iii. Color/font representation.

At this point the browsing of the zoomable text by the user is described.

In a first step, the user starts from any of the priority levels, for example Level 1, Strong:

7.1 a topic of interest is found, the user clicks on a sentence;

7.2 The system detects the position of the click on the screen;

7.3 The system reconciles the click position with the chosen highlight, and creates a pointer;

7.4 Recalculates the relative position of the highlight within the set of highlights.

With the term "pointer" we refer to a vector that references the position of the user clicked highlight within the user interface. This is made so that such highlight is not moved when the new summary is displayed on a new level when requested by the user with a click on a sentence or another command (zoom forward or backwards in the levels). The pointer is built with the elements described above in the "Browsing example", subsection "Identifying the highlight being clicked".

In this example the system represents level 2, Medium priority:

8.1 It reconciles the representation (see paragraph 5.1) and updates.

8.2 It identifies the target position on the basis of the pointer, within the new representation.

8.3 If necessary, it re-aligns the page where the user input has been set.

8.4 Flashes the sentence selected in the previous phase, in order to re-orient the user re-positioning the selected sentence within the new context.

8.5 The user selects a new sentence (of level 2).

8.6 The system updates the pointer.

In the third phase, the system shows level 3, Light priority:

9.1 It reconciles the representation (see paragraph 6.1) and updates 9.2 It identifies the target position based on the user input during the previous phase's selection and recalculates the pointer 9.3 If necessary, it re-aligns the page where the user input has been set.

9.4 Flashes the sentence selected in the previous phase, in order to re-orient the user positioning the selected sentence within the new context.

9.5 The user selects a new sentence in Level 3

9.6 The system updates the pointer.

At this point, the system shows the Original Text level:

10.1 It reloads the original text html page, as edited and saved in the database from the invention as described above.

10.2 It identifies the target position (text element identified by the pointer, which must remain in his position at the required level) on the basis of the user input expressed in the previous phase.

10.3 If necessary, it re-aligns the page where the user input has been set.

10.4 Flashes the sentence selected in the previous phase.

Tables and Documents, Browsing

With reference to FIGS. 14-17, what has already been described above is illustrated.

The purpose of this part is to describe the elements that enable the invention to "treat" multiple different original documents, and to manage different instances of highlight for each original document.

It is also appropriate to point out and remind that the invention can also be represented as an application that deals with only one document at a time, to which it applies a single set of highlights. In a suitable configuration, the method according to the invention can work even directly on original web pages without saving or processing them. In this case there would be an increased risk of errors, for example in cases where scripts of the target page interfered with the ones of the method according to the invention. Moreover, the lack of this part would decrease the overall effectiveness and would not allow the achievement of all objectives and advantages described so far. For example it would force users interested in a specific document to save the original by themselves, or it would leave them exposed to a possible change of the content by the site that hosts it; it would expose them to the risk that their highlighting work went lost. Saving and classification of originals, as well as of individual highlighted instances—although not strictly necessary to obtain good part of the results achieved by the method according to the invention, such as creating multiple levels of summary and text zoom-ability—instead allows the realization of all the parts described so far.

Figures 14, 15:
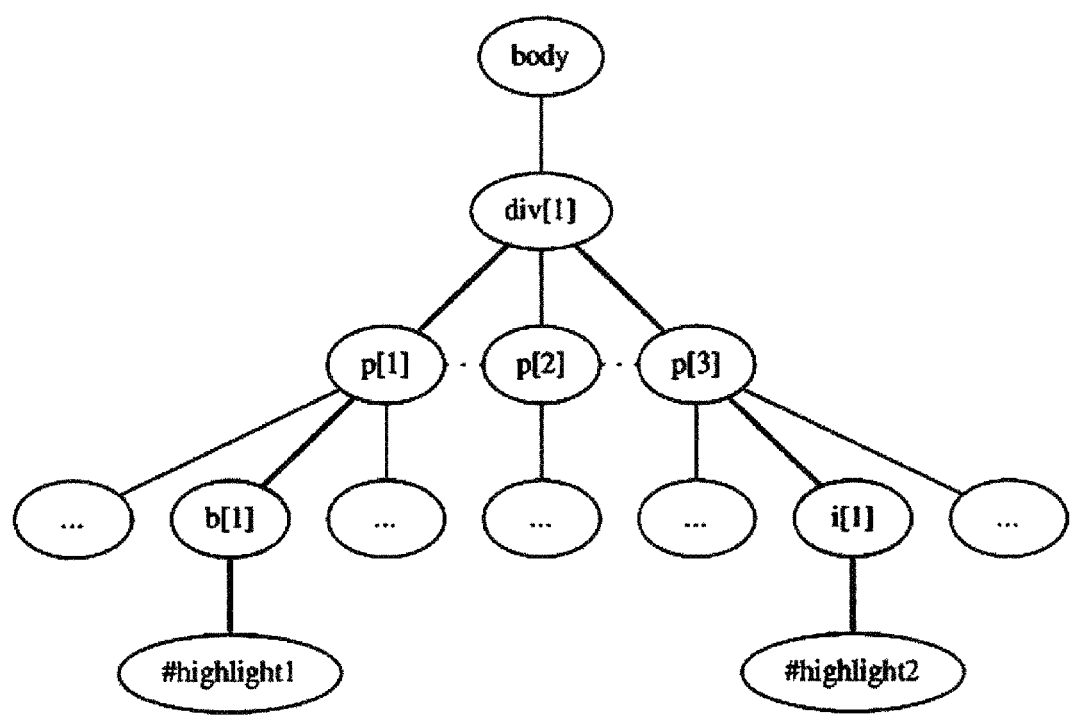
FIG. 14 is a simplified representation of the database according to the invention.
FIG. 15 a simplified HTML tree.

In FIG. 14 a simplified representation of the database according to the invention is shown. In the first table (left window), several original documents processed and saved in the database are stored, each original document being identified by its own ID number. This table stores the location of the original HTML documents without highlights, as processed by the platform.

The processing by the platform consists of:
 saving the current view of the page, i.e. the DOM,
 removing scripts that make the page dynamic,
 updating references to external resources by making them independent of the location of the page itself (i.e. transforming the paths from relative to absolute).

The table helps to identify the document's attributes, such as creation date, source URL, title, description, cover image, information about the stored document format (i.e. whether or not it is encrypted and/or compressed) and additional notes.

In the right window a second table is found, according to the invention, that contains the series of highlighted documents created by the system according to the invention, on the basis of the original documents stored in the left table, and integrated by user-generated highlights. For each underlined document this table stores a record that identifies the original text.

This second document table contains all of the information necessary to identify a single highlighted version of an original document (as mentioned above, the latter can have several different highlighted versions, perhaps created by different users). The list of highlighted versions contains for each instance, information such as the ID (unique identifier of the highlighted document), the modification date, a flag that shows whether the user allows public view of his set of highlights or not, the user ID of the author of the set of highlights, in a way the "owner" of the set of highlights (of that highlighted version of the original document), the "parent" set of highlights if the original document already existed with a different user set of highlights, and the field containing the serialization (or vector, or the reference to an additional database table depending on the implementation version of the invention) which contains the data of the highlights of that specific version: start, end, id and priorities/style of each highlight of the instance.

The implementation of the system according to the invention can have a more articulated structuring of this set of information such as, for example, the use of alternative spatial reference systems (XPath selectors), and the inclusion of the highlighted text, in order to make the system that stores highlights more robust in case of changes in the original document or different interpretations of the HTML DOM by some web browsers, and to allow the search for words or phrases contained in the highlights of all the documents in the database according to the invention using the full-text search functionality of database servers.

The current version uses the Javascript library Rangy (no longer actively developed) to allow the user to highlight selections of the text of a web page using the browser, while for the development version an independent library has been created, that uses the standard currently in development by the W3C called Web Annotation Data Model, to represent the complex of highlights.

Both Rangy and the W3C standard put all of the highlights on the same plane: it is possible to assign to them different style classes, yet none of them suggests or takes into account the possibility of using this information for purposes other than aesthetic. The invention exploits this possibility to connect a style to a different importance level, extract new texts composed with the content selected through highlights, and thanks to the latter keep those texts connected among themselves, and create a special pointer to provide the user with zooming capacity and non-linear access to text (see the "Browsing" section above).

The invention binds the user to use a restricted set of styles and associates to each of these a different level of importance.

Levels 1, 2 and 3 are created in the users browser when he requires access to a summary level, copying the nodes of the highlights from the original layer and inserted into an HTML template devoid of content.

Maintaining Consistency in the Text Structure

To generate the levels of summary while maintaining the structure of the original document, the invention uses its own algorithm to detect if two pieces of text are in the same paragraph or not, or whether they should be shown as contiguous in the summary or arranged on different lines. The algorithm consists in navigating the HTML DOM starting from the two highlights under scrutiny, along the shaft in the direction of the root in order to find their common node; at this point the extended style of the two child nodes containing the corresponding highlights (and any nodes thereby contained) is compared (i.e. computed in its entirety by the web browser) and then the relative position of the highlights among themselves is established. The invention does not just compare the types of nodes, since style sheets applied by different sites and the default browser ones can cause nodes usually appearing within contiguous blocks of text (like for example "b tags", used to delimit bold content) to be presented in different blocks. The invention can analyze paragraph by paragraph, highlight by highlight, and any highlighted text contained in such highlights, and carefully reconstructs the N new structures/levels. In this way, each of the them returns consistent in meaning and representation with the original text. In practice the method within the invention takes "technical" information from the DOM (as paragraphs, page breaks, carriage returns), and the information in the text (carriage returns not present in the HTML, spaces between words, punctuation, upper/lower case) and it makes the necessary adjustments so that the reconstruction is as faithful as possible to the original and properly interpreted.

With reference to FIG. 15, a simplified HTML tree is shown: div[1] is the common node to the two highlights being analyzed; the comparison between the styles of the child nodes p[1] and p[3] (inclusive) determines whether the highlights and their content are represented, in the original text, within the same block.

Zoom

Figure 17:
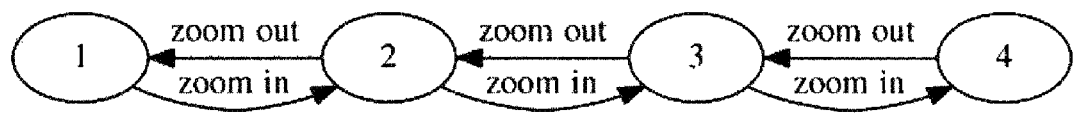
FIG. 17 shows a schematic representation of a zoom operation based on the concept of expansion and collapse.

With reference to FIG. 17, the zoom is based on the concept of expansion and collapse of the text such that a user who is on the level of highest importance (i.e. Level 1, or the most synthetic summary), by pressing on a portion of highlighted text may zoom into a level of more detail, creating an effect similar to that of the zoom adjustment in photography. This is allowed by an anchoring system that utilizes the unique identifier of each highlight and its location within the portion of the page displayed by the browser, thus making it possible to create a graphic effect such that the highlight clicked behaves like a pin.

Figure 16:
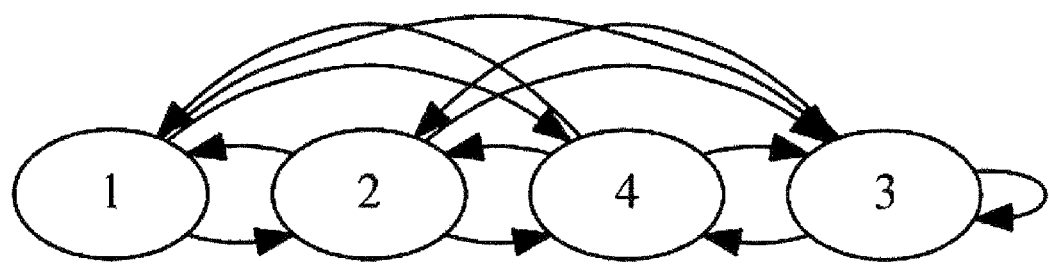
FIG. 16 shows access according to the prior art.

With reference to FIG. 16, access according to prior art is shown for comparison, which by the way remains still possible according to the invention.

Additional Benefits

The results produced through the use of the invention, in addition to making written content more readable for a human being, also allow two important results for applications such as semantic search and artificial intelligence.

In particular the extraction of meaning, that the tool makes very economical and efficient, is part of those activities classified by literature as "human-assisted computation".

Some examples of activities that could greatly benefit are, in particular:

1. Search engines activities (Google, etc.): the main difficulty they encounter is represented by the semantic extraction of the meaning contained in a text. Since the instrument according to the invention generates—through the combination of its own algorithms and human intervention—several versions with simplified meanings, it allows search engines to perform a much more simplified search, whose fruits are more accurate results, and subsequent more accurate indexing of their content. It also means that this would allow the above mentioned engines to perform much more accurate ranking of the same results.

2. Machine learning activities for semantic engines: since even the most sophisticated computers need examples to be able to replicate—at some point in time—human behavior and intelligence, the invention allows to systematize and insert in an easily recognizable pattern (texts have a predictable structure for a semantic engine) the process of extraction of meanings from a text so that it can the represent an example for a machine learning engine. Since it can be applied to any sort of digital text, and to any topic, that can then be processed by human readers for this purpose, the following comparison of two or more summary levels extracted will enable such engines to replicate the selection process and shorten dramatically learning time.

It has to be noted that the invention also allows to separate the moment of creation of the contents from the analysis of results, avoiding the need to observe the real-time extraction process (the norm, in this segment of the research: watching a video recording of a person's driving session does not even allow to obtain 10% of the data harnessed through real-time observation assisted by a sufficient number of sensors, which might allow for better reconstruction of the decision-making process, influenced by a number of events higher than a simple camera could detect).

The invention also allows readers to enrich the texts they read or study, allowing them to show their vantage point of reading in a more complete way; to integrate the original content with their own contribution; to create personal or personalized reading pathways for other readers; to combine multiple texts, complete with the above mentioned benefits.

In the above, preferred embodiments and variants for this invention have been suggested, and it has been especially described its application to HTML documents, but it is to be understood that the skilled in the art can make variations and changes without departing from the related scope of protection, as defined by the appended claims.

The invention claimed is:

1. A method implemented by computer for the generation and navigating of hierarchical zoomable texts starting from an original electronic text,
   wherein a highlighting step is comprised where the original electronic text is highlighted by a single user to produce an highlighted text that includes one or more highlighted text elements, with graphical attributes like fonts and/or colors and/or background and/or dimensions, whereas each highlighted text element has been highlighted by a single user and has a priority tag associated with it, chosen by the single user among two or more pre-defined highlight priority levels, wherein the lowest priority level corresponds to the original electronic text
   wherein a browsing step is comprised where the highlighted text is browsed by a reader,
   in the method the following steps being executed:
   A. in the highlighting step, acquiring and storing on a physical memory of, or connected to, said computer, a starting data set comprising, for each highlight among the one or more highlights:
      its specific priority tag identifying a corresponding priority level;
      its start and end coordinates;
   B. in the navigating step, displaying on a GUI
      a composed text formed only with the text elements identified through said highlights that are associated with a starting priority level chosen by a reader, among the two or more priority levels, together with all of the text elements having priority level higher than the one chosen by the reader, wherein the composed text respects the node structure of the original electronic text, such as a structure defined by one or more of chapter, paragraph, sentence, page breaks, carriage returns;
   C. in the navigating step, receiving:
   C1. a click or press on the screen signal, corresponding to a reader selection, on said GUI, of a text element displayed in phase B, the click or press being suitable for replacing the displayed composed text of step B with a different composed text according to step B wherein the starting priority level has changed interactively, or
      C2 a click or press on a button screen signal, suitable to replace the displayed composed text with a different composed text according to step B wherein the starting priority level is higher or lower than the one in step B interactively;
   D. in the navigating step, using the step A data set, displaying on said GUI, alternatively:
      in case of the C1 signal is received for changing the priority level, said composed text of step B, in which before and after said text element, only elements with a slightly lower priority tag are additionally displayed, together with their corresponding highlights according to the changed priority level; or
      in case of the C2 signal is received for changing the priority level, a different composed text according to step B wherein the starting priority level is higher or lower than the one in step B and wherein the different composed text contains corresponding highlights according to the changed priority level;
      Wherein in both C1 and C2 signal cases, all of the displayed text elements are arranged by eliminating empty spaces and inserting suitable newlines, providing a compact and seamlessly readable displayed rearranged text in which the same node structure of the composed text is maintained;

wherein the displaying of step D is carried out by including the following steps:

E1. the signal of step C1 is translated into a location identifier of said text element on the GUI; and E2. the signal of step C2 is translated into a default position of the GUI corresponding to said displayed rearranged text;

F. the text element of step E1 is maintained in the position described by said identifier, or the rearranged text of step E2 is maintained in the default position of the GUI, in a line of sight within the window or a GUI position chosen by the reader on the basis of the C1 signal, while the other additional text elements of step D coming from the changed priority level are rearranged according to step C and displayed respecting only their reciprocal positions as derived from the start and end coordinates of step A.

2. The method according to claim 1, wherein said location identifier comprises a pair of values, which represent respectively:

the relative position of the part interested by said event within the list of the parts belonging to the same highlight, and the relative position of the highlight to which such part belongs within the list of all the highlights.

3. The method according to claim 1, wherein said predefined position is the center of the screen on which the GUI is displayed.

4. The method according to claim 1, wherein step D is performed on the basis of the results of the following steps carried out before step B:

A1. for the highest priority level, creating a corresponding digital text of the same highest priority, containing at least a portion of said original electronic text whose text elements have the highest priority level associated with them, wherein said text elements maintain, in the new corresponding highest priority text, the same relative position they have in the original electronic text;

A2. for each subsequent lower priority level, creating a corresponding digital text of lower priority level, containing at least a portion of said original electronic text, comprising the text elements associated with such corresponding level of relevance, as well as the text elements associated with all of the higher priority levels, wherein said text elements maintain, in the new lower priority level text, the same relative or absolute position they have in the original electronic text;

A3. storing the corresponding electronic texts created in steps B and C on a physical memory of or connected to said computer, in the form of a database or within appropriately configured variables;

A4. building and storing, for each corresponding electronic text of step A3, at least a corresponding portion of formatted text wherein unnecessary spaces between the text and the new paragraphs are eliminated, and newlines are inserted between such sets of text elements belonging to different phrases in the original electronic text, optionally inserting capital letters at the beginning of each sentence.

5. The method according to claim 1, wherein in step F said text element identified through step C1 signal is made flashing for a specified time.

6. The method according to claim 1, in which other additional electronic texts are stored in said physical memory, whereby to such additional texts is associated a respective additional priority level, that the reader can then display as in step F.

7. The method according to claim 1, whereby the single user can create a new text, including hierarchical highlights, combining the original electronic text and the extracted text portions in steps B and/or C with one or more other texts.

8. The method according to claim 1 wherein, during the execution of step F, data relating to the reader's behavior while browsing said portions of text with different priorities are collected and stored, said data being stored in a specific data set with the purpose of subsequent analysis.

9. The method according to claim 1 wherein, during the execution of step C2, the click or screen on the button press signal corresponds to the reader choice of displaying a priority level just higher, or just lower than the one displayed during step B.

10. A computer program, comprising of code means which, when executed on a computer system comprising a processor, perform the steps of the method according to claim 1.

11. A computerized system, comprising of at least one computer comprising a processor and a physical memory, in particular a client/server system, configured to perform the steps of the method according to claim 1.

* * * * *